(No Model.)
O. VAHLE.
CUTTLE FISH HOLDER.
No. 445,415. Patented Jan. 27, 1891.
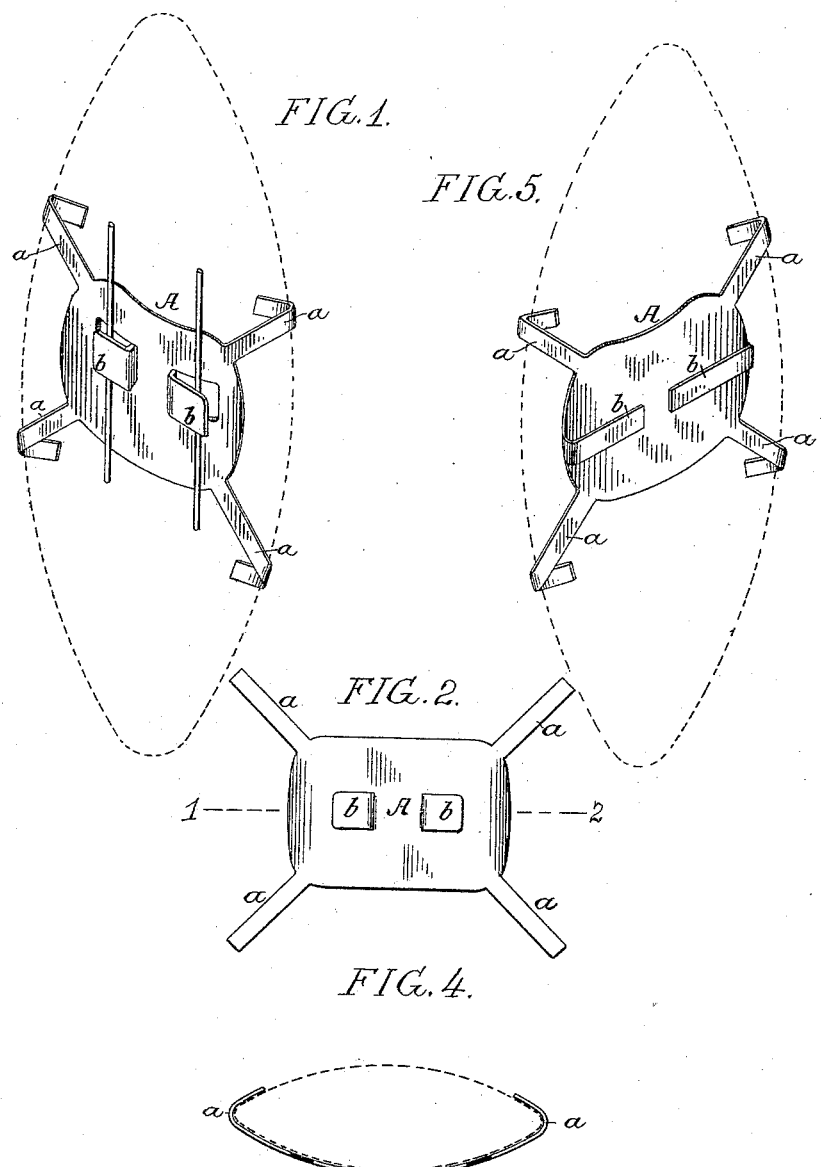

UNITED STATES PATENT OFFICE.

OTTO VAHLE, OF PHILADELPHIA, PENNSYLVANIA.

CUTTLE-FISH HOLDER.

SPECIFICATION forming part of Letters Patent No. 445,415, dated January 27, 1891.

Application filed September 18, 1890. Serial No. 365,331. (No model.)

*To all whom it may concern:*

Be it known that I, OTTO VAHLE, a citizen of the United States, and a resident of Philadelphia, Pennsylvania, have invented certain Improvements in Cuttle-Fish Holders, of which the following is a specification.

The object of my invention is to construct a cheap and secure holding device for the piece of cuttle-fish usually sold for application to bird-cages.

In the accompanying drawings, Figure 1 is a perspective view of a holding device constructed in accordance with my invention, showing its application to a piece of cuttle-fish. Fig. 2 is a view of the holding device prior to its application to the cuttle-fish. Fig. 3 is a sectional view on the line 1 2, Fig. 2. Fig. 4 is a sectional view of the same bent around a cuttle-fish; and Fig. 5 is a view of a modified form of holder.

The holding device consists of a single piece of sheet metal, preferably tin or brass, and is in the form of a central plate A, having a series of radiating arms $a$, the ends of which are bent around the piece of cuttle-fish, as shown in Fig. 1, near the center, thus firmly securing the holder to the cuttle-fish and at the same time allowing the ends to be perfectly free, so that the bird can have an unobstructed use of the fish.

The central plate A is provided with prongs $b$, stamped from the plate A, as shown in Fig. 3, for securing the holder to the cage.

It will be understood that the back of a cuttle-fish is rounding, as shown in Fig. 4, so that when the holder is applied thereto, as shown in said figure, the space between each prong and the plate is tapering, so that when the holder is applied to the wires of the cage, as shown in Fig. 1, the wires are forced into the tapered spaces. Thus the holder is firmly fastened to the cage at any point on the wires and will not be loosened by the picking of the bird.

In the form shown in Fig. 5 the prongs $b$ are formed at the ends of the plate A, instead of being cut out of the body of the plate, and are bent around the wires of the cage in a direction opposite to that of the prongs in the holder shown in Fig. 1. These holders are preferably formed from a single strip of metal by means of a stamping-die, the ends of the arms $a$ being bent around the cuttle-fish by hand. The cuttle-fish with the holders attached can be packed away in about the same space as the cuttle-fish alone, and can be sold for a trifle above the cost of a cuttle-fish.

Having thus described my invention, I claim and desire to secure by Letters Patent—

1. A cuttle-fish holder formed of a single piece of sheet metal, comprising a central body, radiating arms extending from said body for application to a cuttle-fish, said central plate being provided with prongs adapted for attachment to the wires of the cage, substantially as specified.

2. The combination, with a piece of cuttle-fish, of a holder comprising a central plate, radiating arms extending from said plate and bent over the edges of the cuttle-fish at the side, and holding-prongs struck up from the plate, forming, when the holder is applied to the cuttle-fish, tapering spaces for the wires of the cage, substantially as set forth.

In testimony whereof I have signed my name to this specification in the presence of two subscribing witnesses.

OTTO VAHLE.

Witnesses:
HOWARD I. IRELAND,
WM. F. JONES.